C. Churchill.
Grain Drill.
No. 36,072.        Patented Aug. 5, 1862.
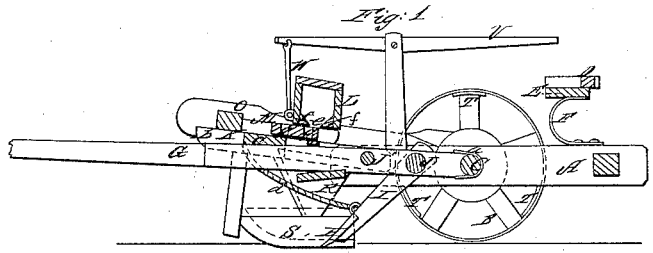
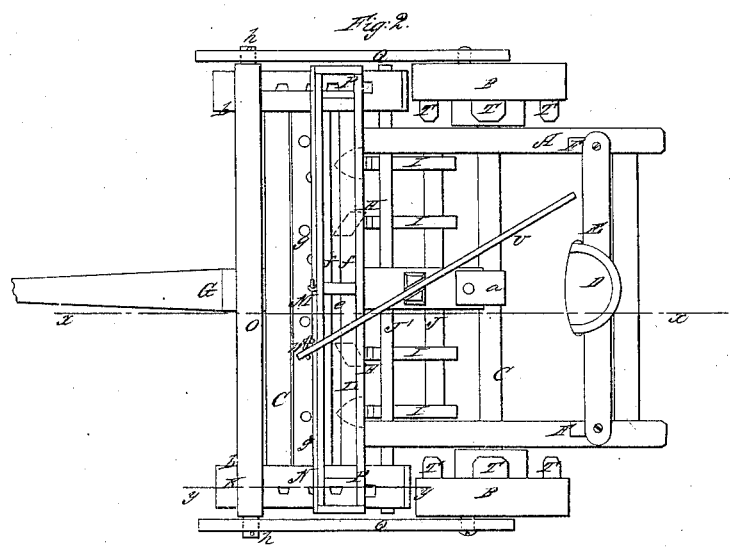
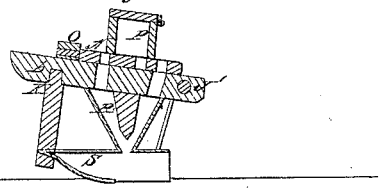
Witnesses:
Inventor:
Castle Churchill
per Munn & Co.
attorneys

UNITED STATES PATENT OFFICE.

CASTLE CHURCHILL, OF NEW HARTFORD, IOWA.

IMPROVEMENT IN SEEDING-MACHINES.

Specification forming part of Letters Patent No. 36,072, dated August 5, 1862.

*To all whom it may concern:*

Be it known that I, CASTLE CHURCHILL, of New Hartford, in the county of Butler and State of Iowa, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken on the line $x\, x$, Fig. 2. Fig. 2 is a plan or top view of the same. Fig. 3, a detached section of a portion of the same, taken in the line $y\, y$, Fig. 2.

Similar letters of reference indicate corresponding parts in the several figures.

To enable those skilled in the art to fully understand and construct my invention, I will proceed to describe it.

A represents a rectangular frame, which is mounted on two wheels, B B, which are attached firmly to their axle C, the latter being allowed to rotate in the frame A.

D is the driver's seat, which is attached centrally to a bar, E, secured to the upper ends of springs or elastic supports F F, on the back part of the frame A; and G is the draft-pole, the back end of which is connected by a metal strap, $a$, with the axle C, the latter being allowed to turn freely within the strap.

H represents the teeth or small covering-shares, which are attached to the lower ends of inclined bars I, the upper ends of the latter being fitted loosely on a rod, J, which passes transversely through the front part of the frame A and through the back part of the draft-pole G.

J′ is a rod, the ends of which project beyond the sides or the frame A, and upon it there is fitted loosely a frame, K, composed of two parallel side bars, $b\, b$, connected by a cross-bar, $c$. The back ends of the side bars, $b\, b$, are fitted on the rod J′, as shown clearly in Fig. 2, and to the front side of the cross-bar $c$ the lower ends of the tooth-bars I are connected by chains $d$.

On the frame K there is placed a seed box or hopper, L, which extends the whole length of the frame, and is permanently attached thereto. This seed box or hopper has a slot, $e$, in its bottom extending the whole length of the latter, the sides of the bottom adjoining the slot being inclined, as shown at $f\,f$ in Fig. 1.

On the frame K there is placed a slide, M, which is perforated with three parallel rows of holes, $g\, g$, and the ends of the slide M are attached to two parallel side pieces, N N, which are also perforated, and are connected at their front ends by a cross-bar, O. The slide M works under the main portion of the hopper containing the slot $e$, while the side pieces, N, work under small hoppers P P at each end of the hopper L. The ends of the cross-bar O have tenons $h\,h$ on them, which are fitted in the front ends of connecting-rods Q Q, the back ends of the latter being attached to the wheels B B at a suitable distance from their center.

From the above description it will be seen that as the machine is drawn along a reciprocating motion will be given the slide M, and as the perforations $g$ pass underneath the slot $e$ the former become filled with seed, the latter being discharged as the holes pass out from underneath the bottom of the hopper at its front and back sides. The discharged seed falls upon an inclined board or scatterer, R, which is attached to the draft-pole G in such a position as to receive the seed and cause it to drop in a broadcast manner directly in front of the teeth on small shares H.

The perforated side pieces, N N, which work underneath the small hoppers P, are for the purpose of dropping corn in hills, and tubes R are attached to the side bars, $b\, b$, of the frame K for the purpose of conveying the corn to hollow shares S, which are attached to the lower ends of the tubes R and form the furrows. (See Fig. 3.)

To the wheels B, at their peripheries, there are attached a series of markers, T, which are composed of flat metal plates projecting from the inner sides of the wheels, as shown in Fig. 2, said plates being attached to the wheels at such points as to press the earth on each dropping of seed and mark the same. At any time when it is necessary to raise the teeth H the operator from his seat D depresses the back end of a lever, U, the front end of which is connected by a rod, W, to the hopper, and thereby raises the frame K, and consequently the teeth H.

The forward and backward movement of the perforated slide M is preferable to the ordinary longitudinally or laterally moving slides, on account of the former not being so liable to choke or clog. The laterally-moving slides act upon the seed in a direction longitudinally with the seed box or hopper, and are not so liable to agitate it, whereas the forward and backward movement of the slide, as in my invention, acts upon the seed in the direction of the width of the hopper, and has a greater tendency to agitate the seed and shake it down in the hopper. The means of operating the slide is also much simpler and less liable to get out of repair than any that can be employed for operating the laterally-moving slides.

I would remark that the wheels B B may be attached firmly to an iron axle, with a crank at each end to work the pitman that moves the slides beneath the seed-box, the axle being allowed to rotate in the frame A and one of the wheels attached permanently to it.

Having thus described my invention, what I claim as new, and desire to secure by Letters Patent, is—

1. The attaching of the hopper or hoppers to a frame, K, hung or placed loosely on the rod J', in combination with the tooth-bars I, connected at their lower ends by chains $d$ to the frame K, and fitted at their back ends loosely on the rod J', whereby the teeth H may be raised from the ground by raising the hopper and frame K, as described.

2. The combination and arrangement of the hopper-frame K and tooth-bars I, as and for the purpose specified.

CASTLE CHURCHILL.

Witnesses:
 CHARLES ENSIGN,
 A. E. CROSSETT,
 G. W. ENSIGN.